United States Patent
Paul et al.

(10) Patent No.: US 7,379,467 B1
(45) Date of Patent: May 27, 2008

(54) SCHEDULING STORE-FORWARDING OF BACK-TO-BACK MULTI-CHANNEL PACKET FRAGMENTS

(75) Inventors: Somnath Paul, Fremont, CA (US); Sanjay Rekhi, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 740 days.

(21) Appl. No.: 10/841,774

(22) Filed: May 6, 2004

Related U.S. Application Data

(60) Provisional application No. 60/469,379, filed on May 8, 2003, provisional application No. 60/469,380, filed on May 8, 2003.

(51) Int. Cl.
*H04L 12/28* (2006.01)
*H04L 12/56* (2006.01)
*H04J 3/16* (2006.01)

(52) U.S. Cl. ............................. 370/412; 370/468
(58) Field of Classification Search .............. 370/300, 370/395.4, 395.41, 395.42, 401, 466, 352
See application file for complete search history.

(56) References Cited

U.S. PATENT DOCUMENTS

| | | | | |
|---|---|---|---|---|
| 5,136,584 A | * | 8/1992 | Hedlund | 370/399 |
| 5,978,868 A | | 11/1999 | Maas | |
| 6,058,114 A | * | 5/2000 | Sethuram et al. | 370/397 |
| 6,252,887 B1 | * | 6/2001 | Wallace | 370/466 |
| 6,513,105 B1 | * | 1/2003 | Pontius | 711/209 |
| 6,680,933 B1 | * | 1/2004 | Cheesman et al. | 370/352 |
| 6,745,264 B1 | | 6/2004 | Luke et al. | |
| 6,982,991 B1 | | 1/2006 | Atoji | |

(Continued)

OTHER PUBLICATIONS

Michael Timothy Moore, Filing the WAN-communications-line card, EDN Magazine, Apr. 18, 2002, pp. 83-90.

(Continued)

*Primary Examiner*—Chau Nguyen
*Assistant Examiner*—Hicham B Foud
(74) *Attorney, Agent, or Firm*—Blakely, Sokoloff, Taylor & Zafman LLP

(57) ABSTRACT

Disclosed is an apparatus and method for an interface for scheduling the store-forwarding of back-to-back multi-channel packet fragments. The apparatus may include a data extraction block, a plurality of data assemblers, a scheduler, and an output memory. The scheduler may be configured to operate according to a scheduling policy. The scheduling policy may include a set of priorities to determine an order of scheduling writes to the output memory from a plurality of data assemblers. The scheduling policy may also include selecting one or more of the plurality of data assemblers having a fill level greater than twice an input data path width of an input data bus and having no end-of-packet (EOP) or start-of-packet (SOP) as a first priority, selecting one or more of the plurality of data assemblers having a fill level greater than twice the input data path width of the input data bus, and not covered in the first priority selection, as a second priority, selecting one or more of the plurality of data assemblers having a fill level greater than the input data path width of the input data bus, and not covered in the first and second priority selections, as a third priority, and selecting one or more of the plurality of data assemblers having an end-of-packet (EOP) as a fourth priority.

21 Claims, 9 Drawing Sheets

U.S. PATENT DOCUMENTS

2003/0120798 A1* 6/2003 Bouchard et al. ........... 709/236

OTHER PUBLICATIONS

Louis E. Frenzel, Programmable Framer Chip Improves OC-48 Efficiency, Electronic Design, Downloaded Apr. 16, 2001, 4 pages.

Nilan Ruparelia, Delivering Ethernet over Sonet using Virtual Concatenation, CommsDesign.com, http://www.commsdesign.com/story/OEG20020225S078, Feb. 25, 2002, 8 pages.

Karl Gass, Russ Tuck, Jeffrey Lynch, System Packet Interface Level 5 (SPI-5): OC-768 System Interface for Physical and Link Layer Devices, Sep. 2002, p. 1-75.

* cited by examiner

PRIOR ART

PRIOR ART

PRIOR ART

SCHEDULING STORE-FORWARDING OF BACK-TO-BACK MULTI-CHANNEL PACKET FRAGMENTS

RELATED APPLICATIONS

This application claims the benefit of U.S. Provisional Application No. 60/469,379, filed May 8, 2003 and U.S. Provisional Application No. 60/469,380, filed May 8, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention pertain to the field of electronic circuitry and, more particularly, to communications systems and protocols.

BACKGROUND

Computer systems can communicate with each other using a variety of networks, for example, Internet Protocol (IP) network and a Synchronous Optical Network (SONET). SONET is the United States standard for synchronous data transmission on optical media. The international equivalent of SONET is synchronous digital hierarchy (SDH). Together, they ensure standards so that digital networks can interconnect internationally and that existing conventional transmission systems can take advantage of optical media.

FIG. 1 illustrates a conventional architecture of a line card, used in a network communication device that includes a link layer device and a framer. The link layer device typically includes components such as a network processor, a network co-processor, memory, datapath switching element (DSE), network search engine (NSE), and a clock management block. The network processor and/or a framer usually performs packet processing functions. Packet processing functions may involve tasks such as packet pre-classification or classification, protocol conversion, quality of service assurance, service policing, provisioning, and subscriber management functions. The framer is used to transport data such as ATM (asynchronous-transfer-mode) cells, IP packets, and newer protocols, such as GFP (generic framing procedure) over SONET (synchronous optical network)/SDH (synchronous packet processing system hierarchy) links. On the line side, the framer may support optical-networking protocols for both SONET/SDH and direct data-over-fiber networks. The framer is coupled to the physical layer port such as a SONET device, which is coupled to a network medium such as optics. On the system side, the framer interfaces to the link-layer device usually through standard buses, for example, the Universal Test and Operation Physical interface device for ATM (UTOPIA) or Packet Over SONET-physical layer (POS-PHY) buses. In a high-speed design as the system operating speed increases it is common design practice to expand the internal bus width. An exemplary 10G (10 gigabits per second) system may have a 128-bit wide bus.

Data may be transported across a network as discrete elements called packets. The System Packet Interface Level 5 (SPI-5) is a commonly used packet interface for high bandwidth applications. This interface is governed by the SPI-5 (OC-768 System Packet Interface) standard issued by the Optical Internetworking Forum (OIF).

In a conventional packet interface, packets may be transported across multiple communication channels of data and may require store and forwarding operations. A conventional packet interface for a multi-channel, high bandwidth application is shown in FIG. 2. This packet interface includes a protocol parser block, a communication channel data extraction block, and a protocol encapsulation and framer block. The protocol parser block takes the input from the SPI-5 interface as a 16-bit wide bus. The input data stream is typically 'jumbled', with packet fragments of data from different communication channels mixed together in the time domain. A conventional interface includes a serial-in-parallel-out (SIPO) block in the parser, between the SPI-5 bus and the data assembler. This block converts the 16 bits to a wider bus (e.g., 32 bytes) regardless of the communication channel boundaries. The purpose of such SIPO operation is to reduce the frequency of operation to an appropriate level. The input data stream may be 'jumbled' because of this reason. The communication channel data extraction block functions to extract and assemble the data from each communication channel into the appropriate communication channels without losing any data. The output data has a fixed width of data per communication channel.

When back-to-back packet fragments for different communication channels coming through an SPI-5 interface are stored, memories corresponding to each communication channel need to be updated as they are received. When implementing this operation for very high speed links (for example 40G, or 40 Gigabits per second), it is possible that the input data bus to the memory system is quite wide (for example 32 bytes, or 256 bits) to accommodate many communication channels per cycle. Thus the storing process may require multiple writes per cycle.

For each communication channel, there exists a separate memory or first-in-first-out (FIFO) memory. This allows a multi-port write, with the number of possible write ports equal to the number of communication channels. A write operation is performed into each FIFO when a word gets accumulated in the corresponding data assembler. A word is shown as 256 bits in FIG. 2, which is the same width as the data path. In one configuration, the width of the data assembler may be about twice the data path width, assuming the data assembler writes to the FIFO only. In a second configuration where both the input bus and the data assembler may write into the FIFO, the width of the data assembler may equal to the data path width. However, the second configuration is likely to have timing problems.

FIG. 3 illustrates a conventional data assembler including a first-in-first-out (FIFO) memory. FIFO memories are commonly used to implement packet processing functions. Referring to the conventional FIFO shown in FIG. 3, the write pointer or read-pointer always increments by one whenever a write or read occurs. Even if a packet fragment is involved in the data transfer, the rest of the bytes in the memory location referred to by that pointer remain unused. This is disadvantageous because it leads to an inefficient use of memory and resources. In addition, there is a bandwidth loss when a read operation is performed, since it is expected to output at a full data rate. It is expected that one data path width of data will be read every clock cycle. Alternately, bandwidth loss can be compensated for by increased frequency of operation.

FIG. 4 shows a conventional implementation of a data extraction block of FIG. 2. In this implementation, it might be possible to optimize the number of write ports to be the maximum number of communication channels contained in each input word. The maximum number of communication channels contained in each input word is likely to be less than the total number of communication channels. FIG. 4 shows the case where the number of port writes is equal to the number of communication channels, and where each communication channel has a FIFO of its own. In another implementation, the number of port writes may be the same as the max number of communication channels contained in the input word, and where the data assembler size can be W.

The conventional interface of FIG. 4 has a per-channel data extraction block, a data assembler block for each communication channel, a FIFO for each communication channel and a read control logic block. The width of '2W' is important in this implementation, assuming that the data assembler writes to the FIFO only. Assuming the data assembler is W−1 bytes full and there is no end-of-packet (EOP) contained in these W−1 bytes, then the next packet fragment can be W bytes. The data assembler has to accommodate these W bytes before it can write into the memory. To achieve this the data assembler should be able to store W−1+W bytes=2W−1 bytes, thus the width requirement is a minimum of 2W−1 bytes.

If the input bus were permitted to directly write into the FIFO separately from the data assembler, then the max width requirement would be W−1 bytes. However, this implementation would involve multiplexing (muxing) bytes from the data assembler as well as the input. It is likely that such an implementation may have timing problems. With the alternate implementation, the minimum width requirement is 2W−1. However it is described as 2W bytes so the read from the FIFO is simplified. The movement of the read pointers inside the data assembler can be only at the W byte boundaries. If the minimum depth is 2W−1, then the read pointers have to move at the byte boundary.

While the conventional technology is relatively simple to implement, the disadvantages include that the conventional technology will require significant memory resources since each memory will have to be able to accommodate the worst case burst and the highest communication channel bandwidth. As a result, the conventional methods will require significant die area and resources to implement. More resources may be required to support overheads due to the use of smaller memories and more routes.

BRIEF DESCRIPTION OF THE DRAWINGS

The present invention is illustrated by way of example, and not by way of limitation, in the figures of the accompanying drawings and in which.

DETAILED DESCRIPTION

Figure 1:
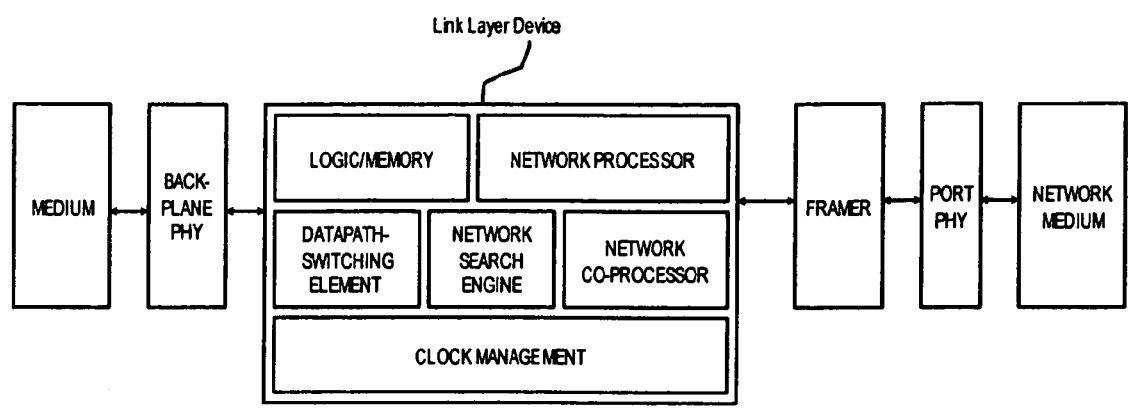
FIG. 1 illustrates a conventional architecture of a line card, used in a network communication device that includes a link layer device and a framer.
Figure 2:
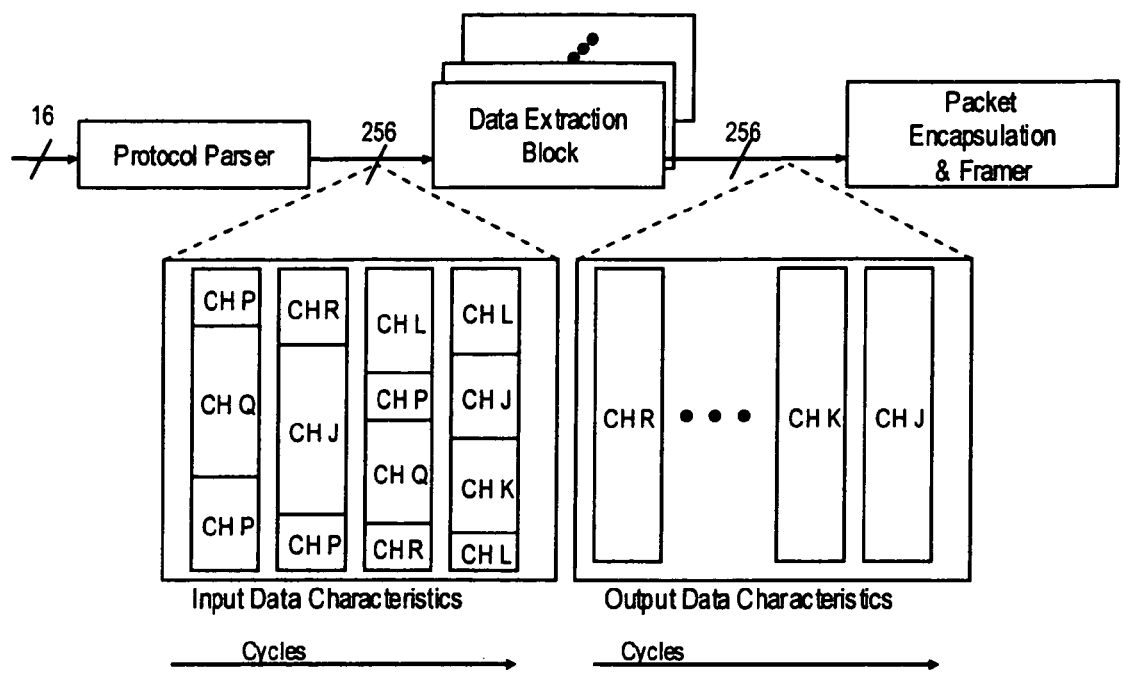
FIG. 2 illustrates a conventional packet interface for a multi-channel, high bandwidth application.
Figure 3:
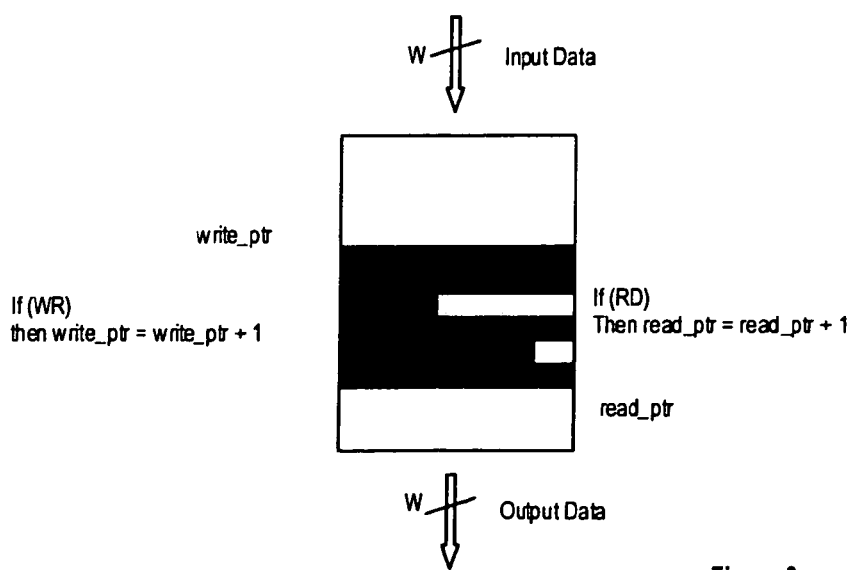
FIG. 3 illustrates a conventional data assembler including a first-in-first-out (FIFO) memory.
Figure 4:
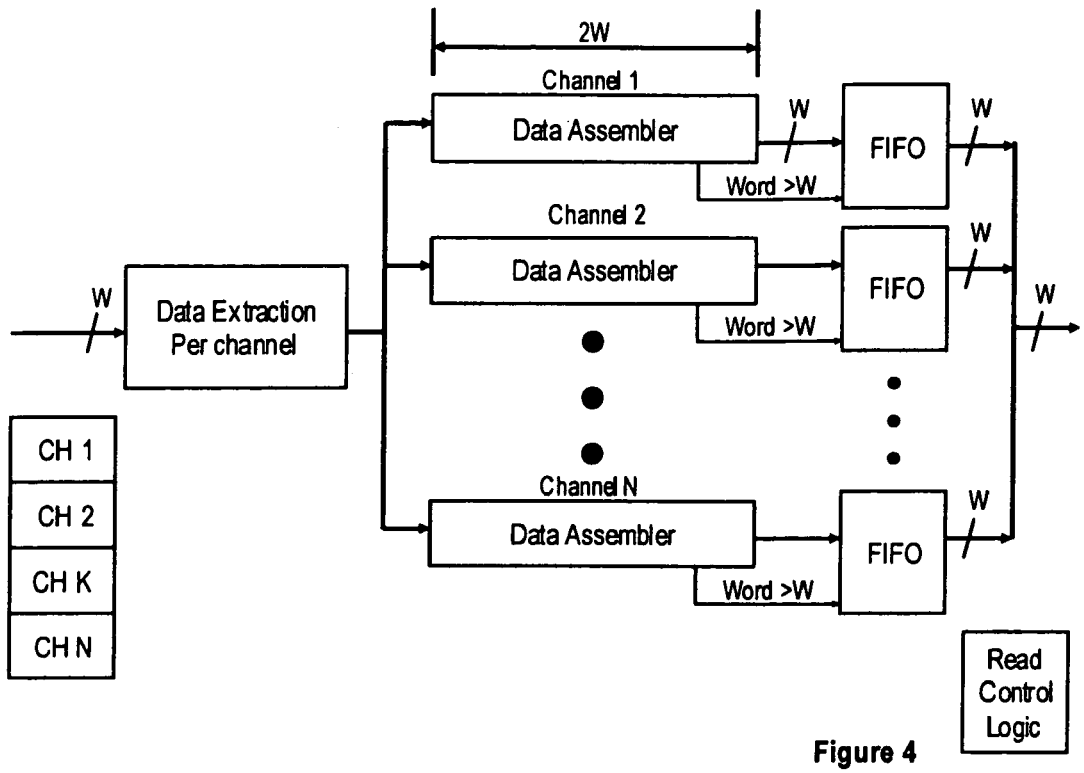
FIG. 4 illustrates a conventional implementation of a data extraction block of FIG. 2.

In the following description, numerous specific details are set forth such as examples of specific components, devices, methods, etc., in order to provide a thorough understanding of the present invention. It will be apparent, however, to one skilled in the art that these specific details need not be employed to practice the present invention. In other instances, well-known components or methods have not been described in detail in order to avoid unnecessarily obscuring the present invention. It should also be noted that the "lines" discussed herein that connect components may be single bit lines, multiple bit lines, or buses. The term "coupled" as used herein means coupled directly to, or indirectly through one or more intervening components. It should be noted that a "physical interface device" is also referred to as a "physical-layer device." It should be noted that at times the following discussion refers to bytes only for ease of illustration. In alternative embodiments, the operations may be performed on another bit group basis with a bit group including one or more bits of data.

A method and apparatus for scheduling store-forwarding of back-to-back multi-channel packet fragments is described. In one embodiment, the apparatus includes a data extraction block, a data assembler, a scheduler, and an output memory. The method and apparatus may allow the storing process to be done one communication channel at a time in a regulated manner without data loss and may allow a single port write operation. A conventional solution using an unregulated storage process may require either multiple single port memories or a multi-port memory to store several communication channels in parallel. In one embodiment, the method and apparatus allow store-forwarding of back-to-back multi-channel packet fragments using a single dual port memory, where the packet fragments of multiple communication channels come through a single high speed interface. In one exemplary embodiment, the single high speed interface may be SPI-5, where one port is used as a write port of a FIFO memory of a data assembler, and the other as a read port of the FIFO memory.

In one embodiment, the method includes receiving input data on an input data bus, extracting packet fragments for a plurality of communication channels from the input data, assembling the packet fragments in a plurality of data assemblers corresponding to the plurality of communication channels, and scheduling data writes from the plurality of data assemblers to an output FIFO memory. In one embodiment, the scheduler implements a scheduling policy for store-forwarding back-to-back multi-channel packet fragments and may be used to determine an order of writes to the output memory from the plurality of data assemblers, which correspond to the plurality of communication channels.

In one embodiment, the data assemblers may include a FIFO memory, a write pointer, and a read pointer, and where the read pointer increments by at least one of a unit access per read and a fraction of the unit access per read, and where the write pointer increments by at least one of a unit access per write and a fraction of the unit access per write.

A method of operating the data assembler is also described. In one embodiment, the data assembler writes variable-size packet fragments in a first-in-first-out (FIFO) memory and increments a write pointer by a number of bytes written in the FIFO memory; and the data assembler reads fixed-size packet fragments from the FIFO memory and increments a read pointer by a number of bytes read from the FIFO memory. In another embodiment, the data assembler writes fixed-size packet fragments in a FIFO memory and increments a write pointer by a number of bytes written in the FIFO memory; and the data assembler reads variable-size packet fragments from the FIFO memory and increments a read pointer by a number of bytes read from the FIFO memory.

Figure 5:
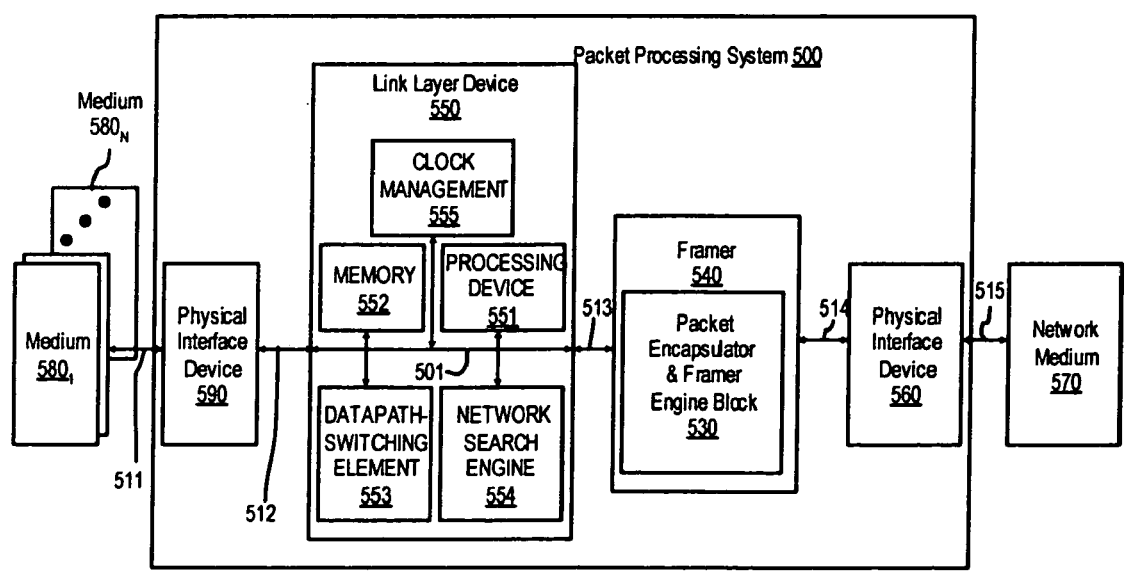
FIG. 5 illustrates one embodiment of a packet processing system including a framer.

FIG. 5 illustrates one embodiment of a packet processing system including a framer. Packet processing system 500 may be used in a communication system such as a computer, server, router, switch, server load balancer, add/drop multiplexer, digital cross connects, or other piece of communication equipment. In one embodiment, the packet processing system 500 may be implemented in a line card that links external network connections to each other. Some examples of line cards include a switch-fabric card, a time-division multiplexed data card, an Ethernet data card and an optical carrier (OC) data card. The communication system that hosts the line card may have, for example, a chassis and a backplane with many slots into which one or more line cards may be mounted. The line cards can be removed and inserted to change the number of ports or to support different communications protocols or physical interface devices. Alternatively, packet processing system 500 may be implemented in other cards or integrated into other system components.

Packet processing system 500 may be coupled to network medium 570 by line 515 and to one or more mediums $580_1$-$580_N$ by line 511. Medium $580_1$-$580_N$ may be similar or dissimilar mediums. In one embodiment, for example, medium 570 may be optics and medium $580_1$ may be copper and medium $580_N$ may be optics. Alternatively, other similar and dissimilar configurations of mediums and network mediums may be used. In one embodiment, N may represent the number of communication ports that are coupled to the packet processing system 500. In one embodiment, packet processing system 500 may include physical interface device 590, link layer device 550, framer 540 which includes packet encapsulator and framer engine block 530, and physical interface device 560. The link layer device 550 is coupled to the physical interface device 590 and framer 540. In an alternative embodiment, framer 540 may include multiple packet encapsulators. In an alternative embodiment, packet processing system 500 may include multiple physical interface devices 590. In one embodiment, the packet processing system 500 may be used as one communication channel from medium 580 to network medium 570. In an alternative embodiment, the packet processing system 500 may be implemented in multiple communication channels from multiple mediums to multiple network mediums. In one embodiment, the mediums and the network mediums may be copper. In alternative embodiments, similar and dissimilar mediums and network mediums may be used.

Link layer device 550 may include a processing device 551, memory 552, datapath switching element (DSE) 553, network search engine (NSE) 554, and/or a clock management block 555. The components of the link layer device 550 may be coupled to each other using one or more buses and/or lines as exemplified by bus 501. In one embodiment, for example, the components of link layer device 550 may be arranged and coupled in a look-aside configuration. In the look-aside configuration the processing device 551 of link layer device 550 may include a network processor and a network co-processor. In the look-aside configuration, the network co-processor resides beside the network processor outside the data path (bus 501), enabling packet co-processing in parallel with the network processor operation, increasing the overall throughput. In another embodiment, the components of link layer device 550 may be arranged and coupled in a streaming configuration. In the streaming configuration, the data path includes both the network processor and the network co-processor. Packets pass through the network co-processor, so it can act on packets as requested by the network processor and pass them directly to the network processor. Alternatively, the components of link layer device 550 may be arranged and coupled in other configurations known in the art.

In one embodiment, the processing device 551 may be a network processor. A network processor is a specialized microprocessor that supports the address sizes and common operations of networking equipment, and may perform some or all the packet processing functions. Typical network processors allow multiple processors to share the computational load of a high-speed data stream. The network processor may be used for processing information and/or controlling the movement of data packets to and from framer 540. In another embodiment, the processing device 551 may be a field programmable gate array (FPGA). Alternatively, the processing device 551 of link layer device 550 may represent one or more other processing devices such as a general-purpose processor (e.g., a Motorola PowerPC™ processor or an Intel® Pentium® processor), a special purpose processor (e.g., a digital signal processor (DSP)), and a controller. In an alternative embodiment, the processing device 551 of the link layer device 550 may not be used, and the processing functions may be performed in the framer 540.

The DSE 553 of link layer device 550 may be used to multiplex the data transmitted on bus 501. The NSE 554 of link layer device 550 may perform data route-table look-ups. In one embodiment, NSE 554 may be, for example, a content addressable memory (CAM) device. In an alternative embodiment, the operations of the NSE 554 may be performed by other devices, for example, a random access memory (RAM) with a hashing function performed in the processing device 551. The NSE 554 may also serve as a server-load balancer, which takes incoming traffic from the Internet and distributes the processing load among a number of servers. Memory 552 of link layer device 550 may include a random access memory (RAM), or other dynamic storage devices, for storing information (e.g., packets) and instructions to be executed by processing device 551 of link layer device 550. The memory 552 of link layer device 550 may be used for storing temporary variables or other intermediate information during execution of instructions by processing device 551. The memory 552 of link layer device 550 may also include a read only memory (ROM) and/or other static storage device for storing static information and instructions for processing device 551 of link layer device 550. It should be noted that link layer device 550 may also include other components that have not been illustrated. It should be noted that the components of link layer device 550 have been shown with separate components. In an alternative embodiment, one or more of the components of link layer device 550 may be combined with other components into one or more integrated circuits.

In one embodiment, framer 540 may be coupled to physical interface device 560. In an alternative embodiment, framer 540 may reside external to packet processing system 500. Framer 540 may include network protocol related circuitry to encode and decode the data that is transmitted on network medium 570 for error detection and correction purposes, and a packet encapsulator and framer engine block 530 that operates to map arbitrary data streams to a regular data stream, as discussed in detail below.

Depending upon the particular design environment implementation, framer 540 may be coupled to a physical interface device 560. Physical interface device 560 may be, for example, a SONET device, an Ethernet card, a token ring card, or other types of physical interface devices for providing a communication link to network medium 570 to and from the framer 540. SONET devices and Ethernet cards are known in the art; accordingly, a detailed discussion is not provided.

It will be appreciated that the packet processing system 500 represents only one example of a packet processing system, which may have many different configurations and architectures. For example, some packet processing systems often have multiple buses, such as a peripheral bus, a dedicated cache bus, etc. As another example, packet processing system 500 may be a line card. In one embodiment, the line card may be used in a system-to-network interface. Alternatively, the line card may be implemented in an intermediate node in a network that provides a network-to-network interface, such as a wide area network (WAN). Such an intermediate node may provide an interface between similar networks or dissimilar networks.

In one exemplary embodiment, packet processing system 500 may be a line card in a WAN connecting a data stream from Ethernet to SONET. In this embodiment, the line card is coupled to an optic network medium (network medium 570) and a copper medium (medium 580) by lines 515 and 511, respectively. The copper medium may include multiple serial ports. The copper medium is coupled to an Ethernet device (physical interface device 590) of the line card by line 511. The Ethernet device acts as a serializer/deserializer (SERDES) and may be a backbone link between multiple line cards. The Ethernet device is coupled to the link layer device 550 by line 512. In such an exemplary embodiment, the link layer device 550 may utilize a FPGA device as processing device 551. In this exemplary embodiment, packet processing functions, such as encapsulating the data into a communication protocol, such as ATM, GFP, and HDLC, that may be performed in processing device 551, are performed by the framer 540. Packet encapsulator and framer engine block 530 of framer 540 performs data modifications to the packet and encapsulates the data into a communication protocol (described in detail below). The framer 540, acting as master device, receives isolated input data packets from the Ethernet device (physical interface device 590) and frames the data to be output as back-to-back framed data to the SONET device (physical interface device 560) on line 514 (described in detail below). The SONET device transmits the framed data over the optic medium (network medium 570) on line 515. In another embodiment, multiple packet processing systems may be implemented in multiple line cards, each line card including a framer and a SONET device coupled to a network medium, and the line cards may be coupled to each other through a backbone physical interface. In an alternative embodiment, the operations discussed below in the context of framer 540 may be performed in other devices, such as, for example, a network processor, co-processor, encapsulator, or switch.

Figure 6:
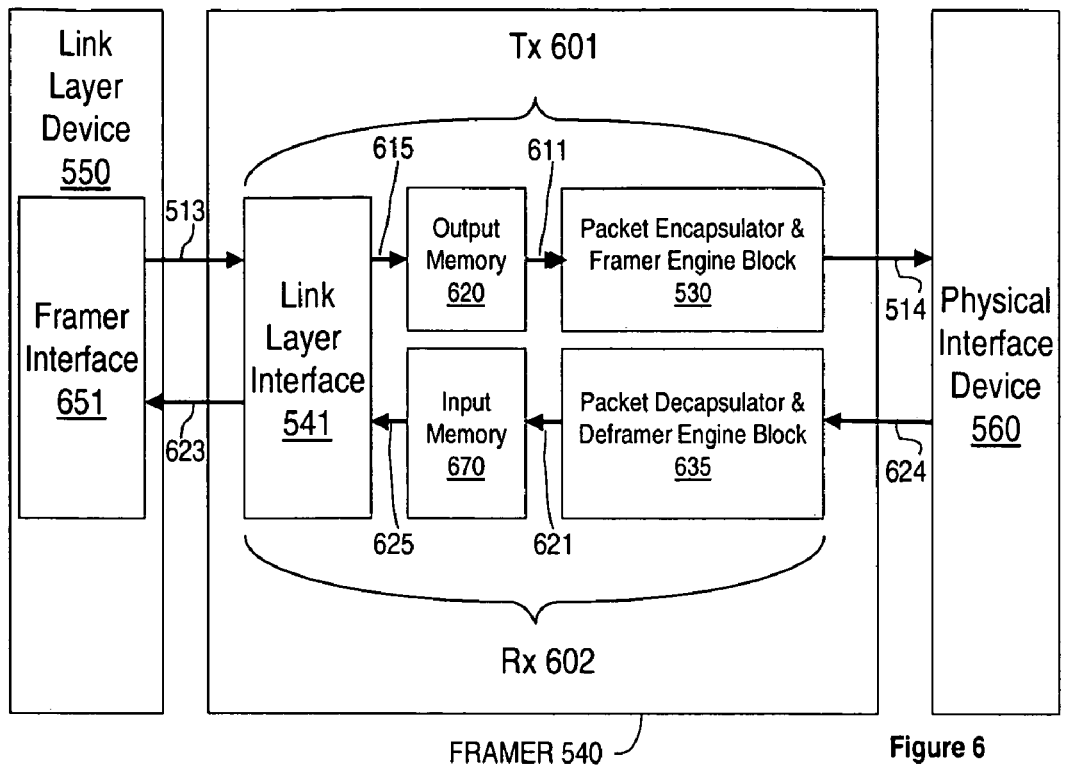
FIG. 6 illustrates one embodiment of a framer including a link layer interface.

FIG. 6 illustrates one embodiment of a framer 540 including link layer interface 541. Framer 540 formats data into a packet protocol structure that may be conducive to transmission and receipt on physical interface device 560. The packet protocol specifies the arrangement of data within the packet. In this embodiment, the data may be transmitted along a transmission (TX) data path 601 of framer 540 from a framer interface 651 of a link layer device 550 to a link layer interface 541 of the framer 540 on line 513, and from the framer 540 to a physical interface device 560 on line 514. Data may also be received along receive (RX) data path 602 of framer 540 from physical interface device 560 to framer 540 on line 624, and from framer 540 to the framer interface 651 of link layer device 550 on line 623. The data paths may be structural portions of the framer 540.

In the transmission data path, framer 540 may include an output memory 620, a packet encapsulator and framer engine block 530. Output memory 620 is coupled to link layer interface 541 and packet encapsulator and framer engine block 530 by lines 615 and 611, respectively. Packet encapsulator and framer engine block 530 is coupled to the physical interface device 560 by line 514. Packet encapsulator and framer engine block 530 of framer 540 performs data modifications to the packet, encapsulates the data into a communication protocol, and formats data into a packet protocol structure that may be conducive to transmission on physical interface device 560. The packet protocol specifies the arrangement of data within the packet.

Data arriving on line 514 faster than the throughput capacity of framer 540 may result in a dropped transmission. Output memory 620 operates to buffer the output data stream sent from link layer interface 541 on line 615 to the packet encapsulator and framer engine block 530 in order to handle overloads of packets in the output data stream. In one exemplary embodiment, output memory 620 may be a single dual port memory. The packet fragments of multiple communication channels may come through a single high speed interface, such as a SPI (e.g., SPI-5), and one port may be used as a write port of a FIFO memory of a data assembler, and the other as a read port of the FIFO memory. In this exemplary embodiment, since a single memory is used, it may allow the depth of memory allocated for each communication channel to be proportionate to its bandwidth and may allow smaller memory overall and lower overhead when compared to a conventional method that implements multiple dual port memories for each communication channel. In an alternative embodiment, it may be possible to use a single port memory, but at the cost of increasing the internal bandwidth to several times of the original bandwidth.

In another embodiment, output memory 620 may be a plurality of memories. In one exemplary embodiment, output memory 620 may be divided into multiple memory segments depending on the number of communication channels and the memory segment size may depend on the communication channel's bandwidth. Each such memory segment behaves as an individual FIFO for each communication channel.

The packet encapsulator and framer engine block 530 may output packed and framed data to the physical interface device 560. The physical interface device 560 may output data to a network medium 570. Network medium 570 may be copper or optics or other network mediums known in the art. It should be noted that packet encapsulator and framer engine block 530 is described and illustrated as one block. In another embodiment, the packet encapsulator and framer engine block 530 may be separate blocks. In alternative embodiments, buffering may be accomplished by other means, for example, using a RAM or a FIFO coupled to framer 540 or memory 552 of link layer device 550. In another embodiment, the functions performed by the packet encapsulator and framer engine block 530 may be performed in other components of framer 540.

Packet encapsulator and framer engine block 530 may operate to map arbitrary data streams to a regular data stream and may operate to align the output data stream packets into frames to be transmitted to the physical interface device 560 on line 514. Packet encapsulator and framer engine block 530 may frame the packets according to a framing specification. The framing specification may be a specification of the "protocol bits" that surround the "data bits" to allow the data to be "framed" into packet fragments. The framing specification may allow a receiver to synchronize at points along the output data stream. Packet encapsulator and framer engine 530 may perform other functions known in the art that are not described so as not to obscure an understanding of embodiments of the invention.

Packet encapsulator and framer engine block 530 may include Cycle Redundancy Check (CRC) computation circuitry to generate a packet error checking code. The packet error checking code may be, for example, appended at the end of a packet (or other locations in the packet) to provide error detection functionality to determine whether a received packet is good or whether errors are present in the data stream. Using packet error checking, CRC computation circuitry in a receiving packet processing system (e.g., CRC computation circuitry in the receive data path 602 may detect transmission errors by recalculating a check code from the data packet and comparing it to a check value originally transmitted). It should be noted that the CRC computation circuitry need not be located in the packet encapsulator and framer engine block 530 and may be disposed at any place along the transmission data path 601.

In the receive data path 602, framer 540 may include a packet decapsulator and deframer engine 635, and an input memory 670. Packet decapsulator and deframer engine 635 is coupled to the input memory 670 and physical interface device 560 by lines 621 and 624, respectively. Input memory 670 is coupled to the link layer interface 541. Packet decapsulator and deframer engine 635 removes the framing data from packets. When framing data is removed from a packet, the data therein may become irregular. Input memory 670 is coupled to framer interface 651 of link layer device 550 by line 623. Input memory 670 operates to buffer the data stream input into link layer device 550. It should be noted that packet encapsulator and framer engine 530, packet decapsulator and deframer engine 635, and/or framer 540 may include other components known in the art that are not shown so as not to obscure an understanding of embodiments of the invention. In an alternative embodiment, for example, additional FIFOs may be present that operate to buffer the data stream transmitted and received to/from physical interface device 560 on lines 514 and 624, respectively. It should be noted that the framer 540 has been shown with block components only for ease of illustration and discussion. One or more of the block components of framer 540 may be combined with other components into one or more integrated circuits.

Packet decapsulator and deframer engine 635 may include CRC computation circuitry for performing packet error checking. CRC computation circuitry may operate to verify the accuracy of the data stream by generating a code using the received data and comparing the generated code with a received code embedded in the data stream to determine whether a packet is good or whether errors are present. In one embodiment, the data stream checked at this receiving end by packet decapsulator and deframer engine 635 uses essentially similarly processes to those used to generate the code for transmission by packet encapsulator and framer engine 530. As such, although illustrated separately, packet encapsulator and framer engine 530 and packet decapsulator and deframer engine 635 may be a single packet encapsulator/decapsulator and/or a single framer engine including CRC computation circuitry.

Figure 7:
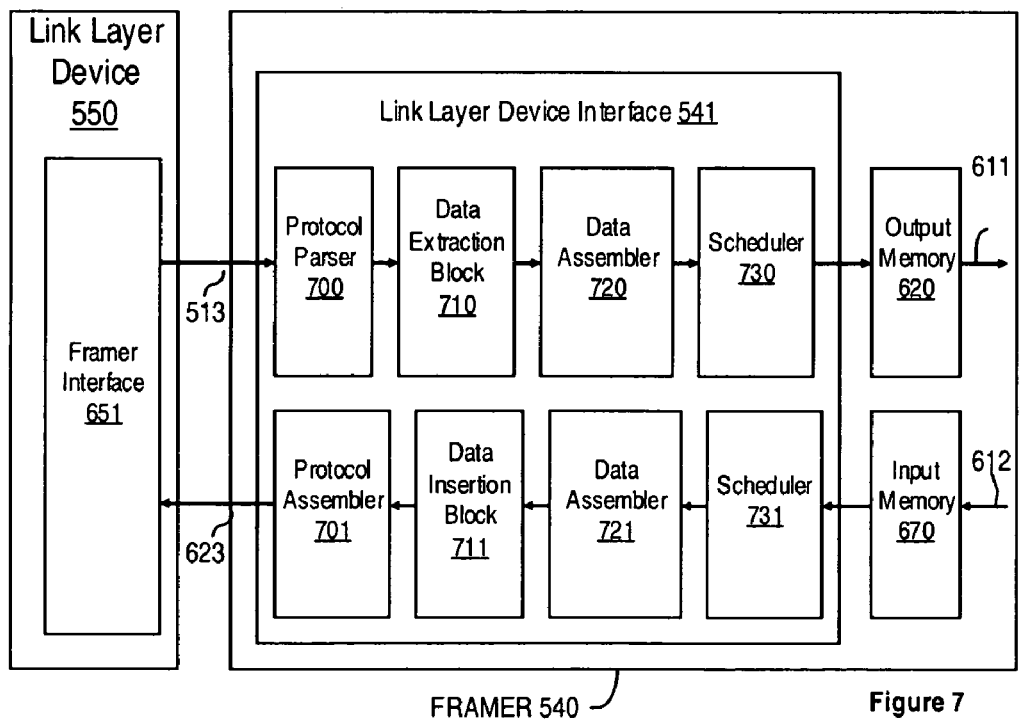
FIG. 7 illustrates an exemplary embodiment of a link layer interface of a framer including a data assembler and a scheduler.

FIG. 7 illustrates one exemplary embodiment of a link layer interface of a framer including a data assembler and a scheduler. In one embodiment, the link layer interface 541 of framer 540 may include a protocol parser 700, a data extraction block 710, a data assembler 720, and a scheduler 730. The protocol parser 700 is coupled to the framer interface 651 of the link layer device 550 by line 513. The data extraction block 710 is coupled to the protocol parser 700 and the data assembler 720. The data assembler is coupled to the scheduler 730. The scheduler 730 is coupled to the output memory 620. The output memory 620 is coupled to the packet encapsulator and framer engine block 630 by lines 611.

In one embodiment, the protocol parser 700 takes the input from the input data bus of the link layer interface 541 of framer 540. In one exemplary embodiment, the link layer interface 541 may receive data from a SPI-5 interface as a 16-bit wide bus. The input data stream may be 'jumbled', with packet fragments of data from different communication channels mixed together in the time domain. A conventional interface includes a SIPO block in the parser between the SPI-5 bus and the data assembler 720. The protocol parser 700 may convert the 16 bits to a wider bus (e.g., 32 bytes) regardless of the communication channel boundaries. The purpose of such SIPO operation may be to reduce the frequency of operation to an appropriate level for computation by the framer 540. The input data stream may appear jumbled because of this reason. In other words, the wider bus at the output of SIPO block may consist of data bytes from multiple channels. The data extraction block 710 may function to extract and assemble the data from each communication channel into the appropriate communication channels without losing any data. The output data may have a fixed data path width per communication channel.

The link layer device 550 transmits data to the physical interface device on a transmission data path 601 from line 513 to line 514. The data extraction block 710, protocol parser 700, data assembler 720 and the scheduler 730 may be configured to be part of the transmission data path 601 from link layer device 550 to physical interface device 560. In another embodiment, the scheduler 730 may not be in the transmission data path 601 and may be configured to control the output data from the data assembler 720 to the output memory 620.

In another embodiment, the framer 540 may include in addition to the transmission data path 601, as previously described, a receive data path 602 from the physical interface device 560 to the link layer device 550. In one embodiment, the receive path 602 may include data insertion block 711, protocol assembler 701, data assembler 721, and scheduler 731. The data insertion block 711 is coupled to the data assembler 721 and the protocol assembler 701. The scheduler 731 is coupled to the data assembler 721 and input memory 670. Input memory 670 is coupled to the packet decapsulator and deframer engine block 635 by line 612. The protocol assembler 701 is coupled to the framer interface 651 of link layer device 550 by line 623. The packet decapsulator and deframer engine block 635 transmits data to the link layer device 550 on a receive data path 602 from line 621 to line 623.

In one embodiment, the scheduler 730 and 731 may be combined in one block. In another embodiment, the combined scheduler block may be outside the transmission data path 601 and the receive data path 602 and the scheduler block may be configured to control the output data from the data assembler 720 to the output memory 620, and the input data sent from the input memory 670 to the data assembler 731. It should be noted that the framer 540 in one embodiment, may be configured to include only a transmission data path 601. In another embodiment, the framer 540 may be configured to include only a receive data path 602.

Figure 8:
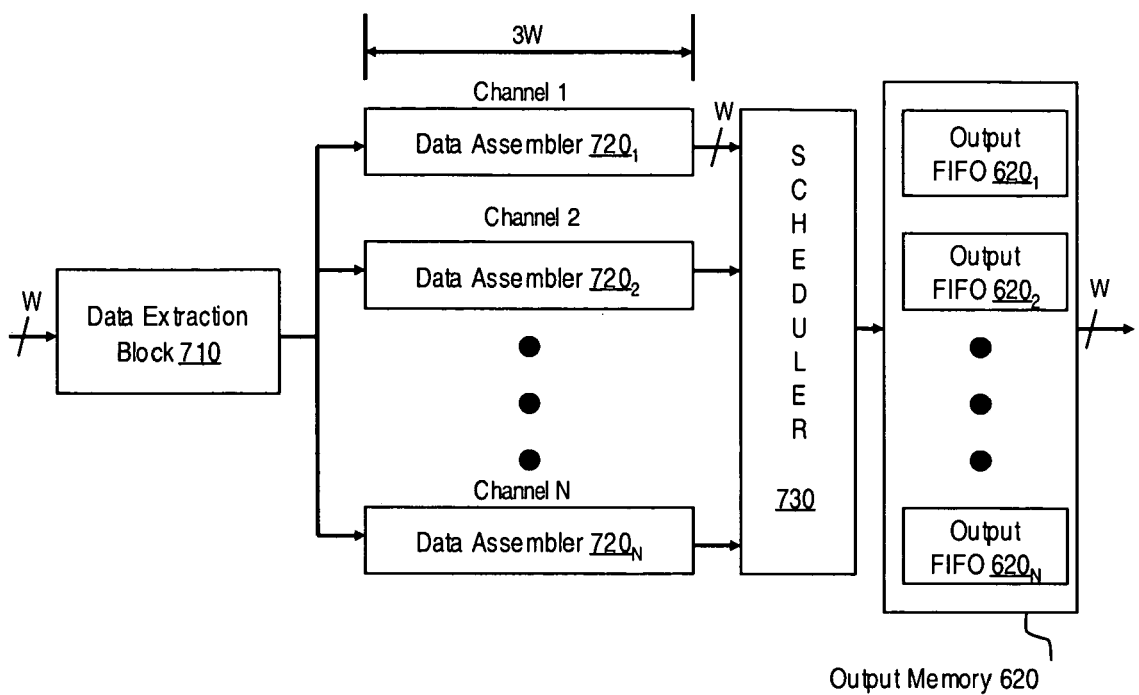
FIG. 8 illustrates one embodiment of a link layer interface of a framer including multiple data assemblers and a scheduler.

FIG. 8 illustrates one embodiment of a link layer interface of a framer including multiple data assemblers and a scheduler. The link layer interface 541 may include a data extraction block 710 coupled to a plurality of data assemblers $720_1$-$720_N$. The plurality of data assemblers $720_1$-$720_N$ are coupled to a scheduler 730, and the scheduler 730 is coupled to an output memory 620. The plurality of data assemblers $720_1$-$720_N$ corresponds to a plurality of communication channels 1-N. The output memory 620 may be divided into N number of multiple memory segments corresponding to N number of communication channels. In one embodiment, the multiple memory segments may be divided such that each communication channel has an equal segment size. In another embodiment, the multiple memory segments' size may depend on the bandwidth of a particular communication channel that corresponds to that memory segment. The output memory 620 may include 1-N memory segments that behave as individual FIFOs, output FIFO $620_1$-$620_N$. In one embodiment, the memory segments of output memory 620 may behave like individual FIFOs logically even though the multiple output FIFOs $620_1$-$620_N$, may reside in the same physical memory. Alternatively, output FIFOs $620_1$-$620_N$ may reside on different memories. The data extraction block 710 may extract data from the input data bus and separate the data into corresponding data assemblers per each communication channel without losing any data. In one embodiment, the link layer interface 541 may also include a read control logic block for controlling the reads from the output memory 620.

In one exemplary embodiment, the plurality of data assemblers $720_1$-$720_N$ have a width of 3W, that is the width of the data assemblers $720_1$-$720_N$ are three times the width of the input data bus of the data extraction block 710. The scheduler 730 of the link layer interface 541 may regulate the way the communication channels are written to the output memory 620 according to a scheduling policy. The scheduling policy assumes a single port write for the multiple communication channels to the output memory 620.

In one exemplary embodiment, the data assembler 720 may include a FIFO memory with a read pointer and a write pointer. The read pointer of the FIFO memory may increment by a unit access per read and the write pointer of the FIFO memory may increment by a unit access per write. In another embodiment, the read pointer of the FIFO memory may increment by the unit access per read and the write pointer of the FIFO memory may increment by a fraction of the unit access per write, described in detail below in relation to FIGS. 9-12. In another embodiment, the read pointer of the FIFO memory may increment by a fraction of the unit access per read and the write pointer of the FIFO memory may increment by the unit access per write, described in detail below in relation to FIGS. 9-12.

In one embodiment, where the output memory 620 has only one memory write per cycle, the data path width of the data assemblers $720_1$-$720_N$ may need to be increased beyond the width of 2W, that is the width of the data assemblers $720_1$-$720_N$ may be increased beyond two times the width of the input data bus of the data extraction block 710.

In one exemplary embodiment of a high speed SPI-5 interface, the output of the extraction block 720 of the link layer interface 541 may include a maximum of 8 communication channels of information per clock cycle and the data is sent to the data extraction block 710 on a 32 byte wide data path, since each communication channel may occupy a minimum of 4 byte-times; 2 bytes for the data and 2 bytes for an address control word corresponding to each communication channel. This embodiment assumes that the 2 bytes received from the link layer interface 541 on the input data bus are aligned always in 2 byte boundaries; otherwise the link layer interface 541 may need 9 communication channels maximum instead of 8 communication channels maximum. Such small packet fragments usually occur at the end of the packet. If the data assembler's 720 width is 2W as previously discussed, it may be possible that when eight data assemblers are 2W−1 full, they may be filled simultaneously in one clock cycle. It may also be possible that when eight data assemblers are 2W−1 full, one of the data assemblers may be written with another W bytes of data in one clock cycle. This may require the minimum width to be 3W for each assembler. Subsequent cycles may contain packet fragments for different communication channels, which may require additional buffering in order to avoid overrun of the data assemblers $720_1$-$720_N$. Since the output memory 620 has single write port, and since there are multiple data assemblers which may be full, overrun may occur if those data assemblers are written with more data in subsequent cycles.

Figure 9:
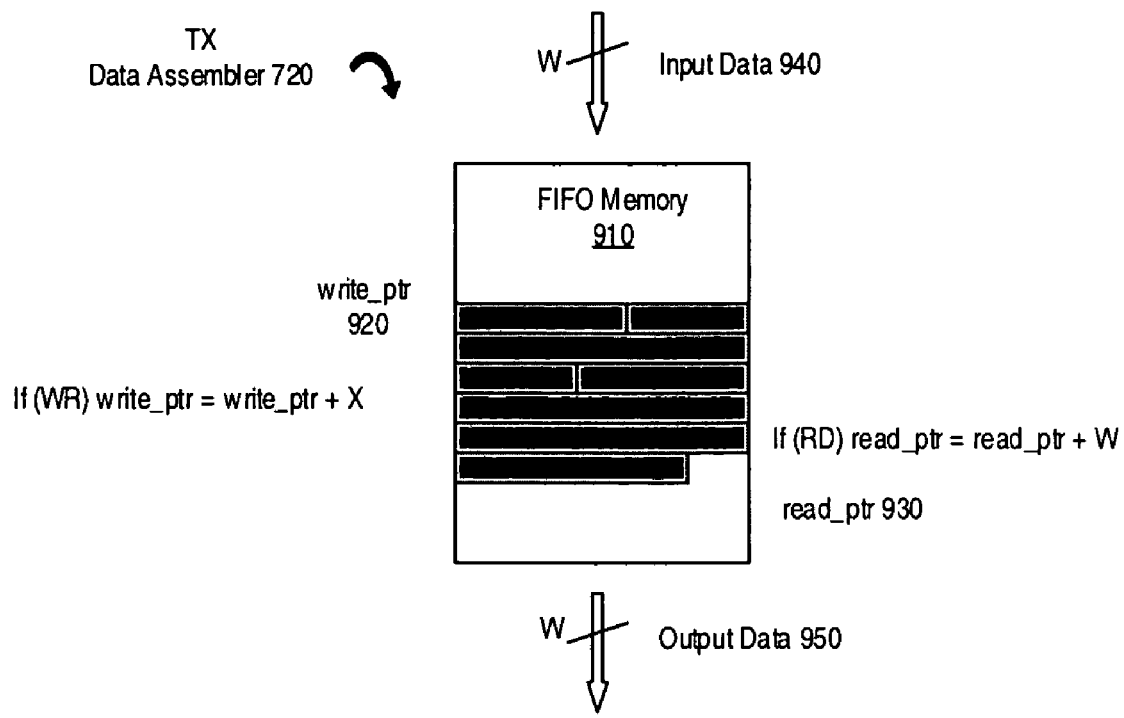
FIG. 9 illustrates one embodiment of a data assembler including a FIFO memory for buffering packets in a transmission data path.

FIG. 9 illustrates one embodiment of a data assembler including a FIFO memory for buffering packets in a transmission data path. The data assembler 720 of FIG. 9 includes a FIFO memory 910, a write pointer 920 (write_ptr), a read pointer 930 (read_ptr). Input data 940 is written to the FIFO memory 910. Output data 950 is read from the FIFO memory 910. The input data 940 and the output data 950 have a data path width of W. As previously discussed a conventional FIFO memory increments the write pointer by a unit access (e.g., W) per write, and increments the read pointer by the unit access (e.g., W) per read, where W may be the data path width of the input data 940 and output data 950. In one embodiment, upon each write to the FIFO memory 910, the write pointer 920 increments by X, a fraction of a unit access, and upon each read from the FIFO memory 910, the read pointer 930 increments by the unit access. The unit access may correspond to a fixed number of bytes (e.g., fixed-size packet fragments) read from the FIFO memory 910 each read cycle. In one embodiment, the fixed number of bytes read is equal to the data path width W of output data 950. In one embodiment, the fraction of the unit access is equal to the number of bytes written to the FIFO memory 910 each write cycle when fragmented (e.g., variable-size packet fragments). In one embodiment, the maximum read pointer value may be equal to the capacity of the FIFO memory 910 divided by the data path width W.

In one embodiment, the write pointer 920 may have a resolution of less than a data word width W and the read pointer 930 may have a resolution of the data word width W. In another embodiment, the write pointer 920 may have a resolution of a data word width W and the read pointer 930 may have a resolution of less than the data word width W. In another embodiment, the write pointer 920 may have a resolution of at least one of less than and equal to a data word width W and the read pointer 930 may have a resolution of at least one of less than and equal to the data word width W.

In one embodiment, if there is a read operation and the number of bytes read each cycle is W then the read pointer 930 would increment by W, where W is the size of the data path of the FIFO memory 910, as expressed in equation (1) below. If there is a write operation, the write pointer 920 increments by X, where X is the size of data (e.g., variable-size packet fragment) written to the FIFO memory 910, and where X is less than or equal to W, the unit access, as expressed in equation (2) below. In alternative embodiments, other numbers of bytes read may be used.

$$\text{If (RD), read\_}ptr=\text{read\_}ptr+W \quad (1)$$

$$\text{If (WR), write\_}ptr=\text{write\_}ptr+X \quad (2)$$

In one exemplary embodiment, FIFO memory 910 may have a capacity of 96 bytes. The fixed number of bytes read is 32 bytes and the write pointer 920 varies between 0 and 95, the resolution of the write pointer 920, and the read pointer 930 may vary between 0 and 2, the resolution of the read pointer 930. In this embodiment, the read pointer 930 may increment by 32 bytes, which is a fixed-size packet fragment each time, as expressed in equation (3) below. The number of bytes written may be variable-size packet fragments, X. For example, if a packet fragment of 8 bytes is written into FIFO memory 910, then the write pointer 920 increments by 8, as expressed in equation (4) below.

$$\text{If (RD), read\_}ptr=\text{read\_}ptr+32 \quad (3)$$

$$\text{If (WR), write\_}ptr=\text{write\_}ptr+8 \quad (4)$$

In one embodiment, the status of the FIFO memory 910 may be generated in a similar manner based on the read and write pointers as previously discussed. The full flag, empty flag, and other flag computations of the FIFO memory 910 may be performed as done in conventional FIFOs. In one embodiment, the FIFO memory 910 may be considered non-empty when one full data word is written, where the data word is equal to the data path W of output data 950 of the FIFO memory 910 (e.g., 32 bytes as in the exemplary embodiment described above).

An advantage of the FIFO memory 910 is that it may allow fragmented writes with more efficient use of memory than a conventional FIFO. Another advantage is that there is no bandwidth loss when a read operation is performed, and thus no requirement to compensate for bandwidth loss by increasing the frequency of operation.

Figure 10:
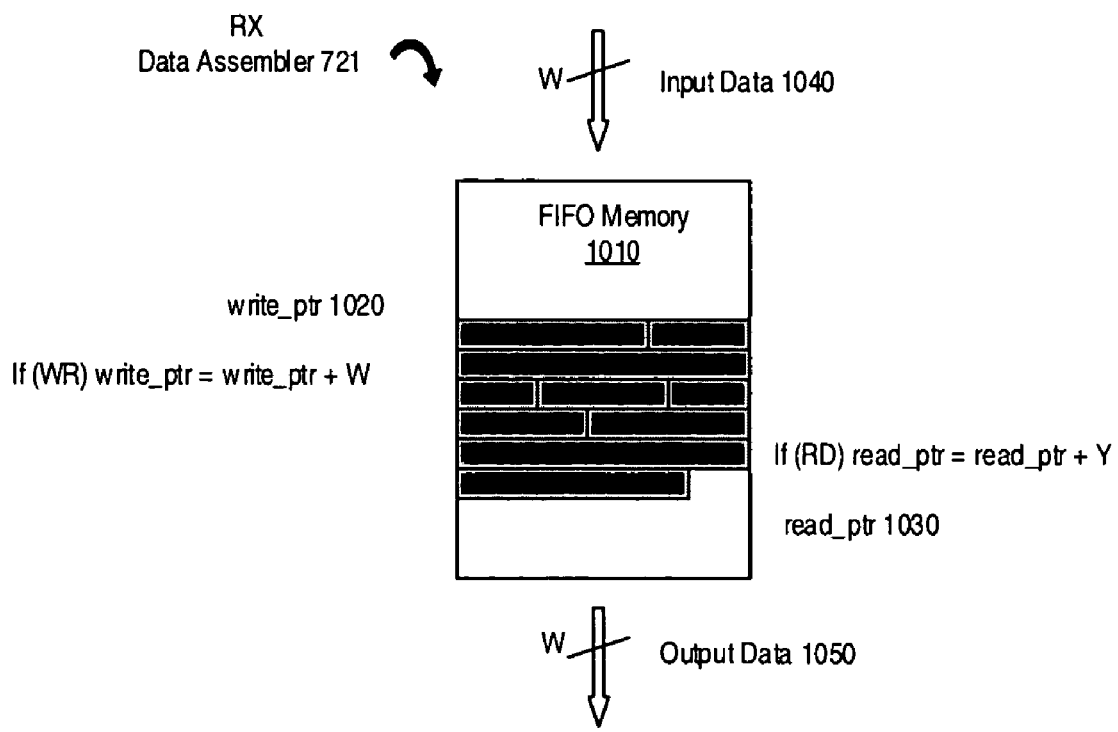
FIG. 10 illustrates one embodiment of a data assembler including a FIFO memory for buffering packets in a receive data path.

FIG. 10 illustrates one embodiment of a data assembler including a FIFO memory for buffering packets in receive data path 602. The data assembler 721 of FIG. 10 includes a FIFO memory 1010, a write pointer 1020 (write_ptr), a read pointer 1030 (read_ptr). Input data 1040 is written to the FIFO memory 1010. Output data 1050 is read from the FIFO memory 1010. The input data 1040 and the output data 1050 have a data path width of W. As previously discussed a conventional FIFO memory increments the write pointer by a unit access (e.g., W) per write, and increments the read pointer by the unit access (e.g., W) per read, where W may be the data path width of the output data 1050 and the input data 1040. In one embodiment, upon each read to the FIFO memory 1010, the read pointer 1030 increments by Y, a fraction of the unit access, and upon each write to the FIFO memory 1010, the write pointer 1020 increments by the unit access. In this embodiment, the unit access may correspond to a fixed number of bytes (e.g., fixed-size packet fragments) written to the FIFO memory 1010 each write cycle. In one embodiment, the fixed number of bytes written is equal to the data path width W of the input data 1040. In one embodiment, the fraction of the unit access is equal to the number of bytes read from the FIFO memory 1010 each read cycle when fragmented (e.g., variable-size packet fragments). In one embodiment, the maximum write pointer value may be equal to the capacity of the FIFO memory 1010 divided by the data path width W.

In one embodiment, if there is a write operation and the number of bytes written each cycle is W then the write pointer 1020 would increment by W, where W is the size of the data path of the FIFO memory 1010, as expressed in equation (5) below. If there is a read operation, the read pointer 1030 increments by Y, where Y is the size of data (e.g., variable-size packet fragment) read from the FIFO memory 1010, and where Y is less than or equal to W, the unit access, as expressed in equation (6) below. In alternative embodiments, other numbers of bytes written may be used.

$$\text{If (WR), write\_}ptr=\text{write\_}ptr+W \quad (5)$$

$$\text{If (RD), read\_}ptr=\text{read\_}ptr+Y \quad (6)$$

In one exemplary embodiment, FIFO memory 1010 may have a capacity of 96 bytes. The fixed number of bytes written is 32 bytes and the read pointer 1020 varies between 0 and 95, the resolution of the read pointer 1020, and the write pointer 1030 may vary between 0 and 2, the resolution of the write pointer 1030. In this embodiment, the write pointer 1020 may increment by 32 bytes, which is a fixed-size packet fragment each time, as expressed in equation (7) below. The number of bytes read may be variable-size packet fragments, Y. For example, if a packet fragment of 8 bytes is read from FIFO memory 1010, then the read pointer 1030 increments by 8, as expressed in equation (8) below.

$$\text{If (WR), write\_}ptr=\text{write\_}ptr+32 \quad (7)$$

$$\text{If (RD), read\_}ptr=\text{read\_}ptr+8 \quad (8)$$

In one embodiment, the status of the FIFO memory 1010 may be generated in a similar manner based on the read and write pointers as previously discussed. The full flag, empty flag, and other flag computations of the FIFO memory 1010 may be performed as done in conventional FIFOs. In one embodiment, the FIFO memory 1010 may be considered non-empty when one full data word is written, where the data word is equal to the data path W of output data 1050 of the FIFO memory 1010 (e.g., 32 bytes as in the exemplary embodiment described above).

An advantage of the FIFO memory 1010 is that it may allow fragmented reads with more efficient use of memory than a conventional FIFO. Another advantage is that there is no bandwidth loss when a write operation is performed, and thus no requirement to compensate for bandwidth loss by increasing the frequency of operation.

Figure 11:
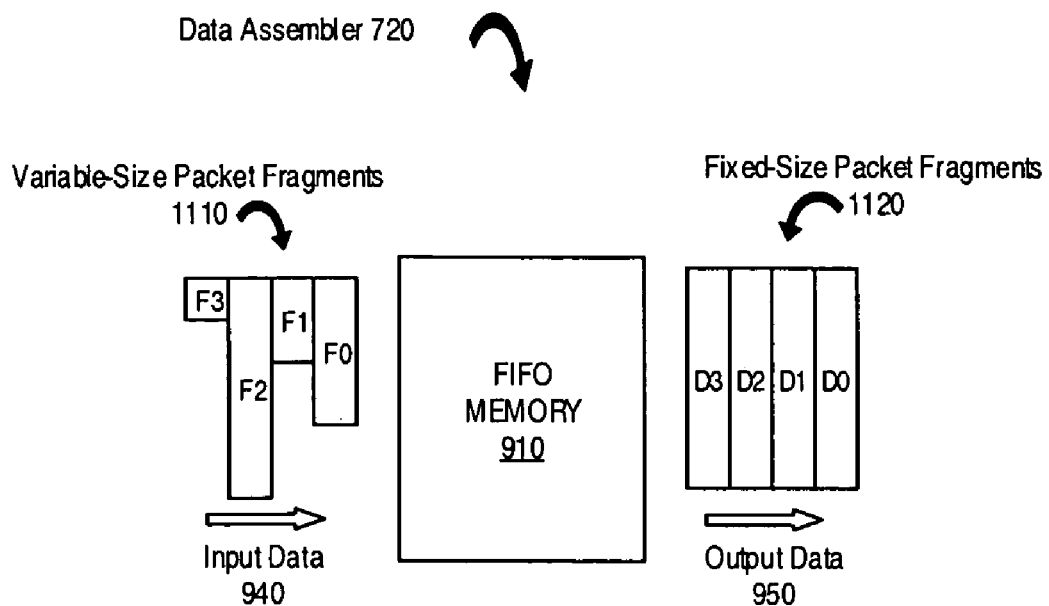
FIG. 11 illustrates the operation of one embodiment of a data assembler including a FIFO memory for buffering packets in a transmission path.

FIG. 11 illustrates the operation of one embodiment of a data assembler including a FIFO memory for buffering packets in a transmission path. Data assembler 720 includes a FIFO memory 910. Input data 940 is written to the FIFO memory 910. The input data 940 may include variable-size packet fragments 1110. Output data 950 is read from the output FIFO memory 910. The output data 940 may include fixed-size packet fragments 1120. In this embodiment, the FIFO memory 910 may be used to buffer variable-size packet fragments 1110, and output fixed-size packet fragments 1120. The variable-size packet fragments 1110 may be smaller than the fixed-size packet fragments 1120. In one embodiment, the fixed-size packet fragments 1120 may have a unit access width W, and the variable-size packet fragments 1110 may have a fraction of a unit access width X, a. In one embodiment, the fraction of the unit access may be equal to the number of bytes of the input data 940 (e.g. variable-size packet fragments) that is written to the FIFO memory 910 and the unit access may be equal to the number of bytes of the output data 950 (e.g., fixed-size packet fragments) that is read from the FIFO memory 910. In one embodiment, the data assembler 720 may be used when data is extracted from a SPI, such as SPI-5. In another embodiment, the data assembler 720 may be used when data is extracted from a data bus and is stored in a FIFO. In one embodiment, the data assembler 720 implements a fixed transfer on read side, and a variable-size transfer on the write side. Data assembler 720 may assemble data for multiple byte widths, for example, 32 bytes (256 bits). Alternatively in a 10G (10 gigabits per second) system, the byte width may be 16 bytes (128 bits). The input data 940 may be packet fragments that are less than the data path width W (e.g., variable-size packet fragments 1110) and may be written into the FIFO memory 910. The output data 950 may be packet fragments that are equal to the data path width W (e.g., fixed-size packet fragments 1120) and may be read from the FIFO memory 910.

Figure 12:
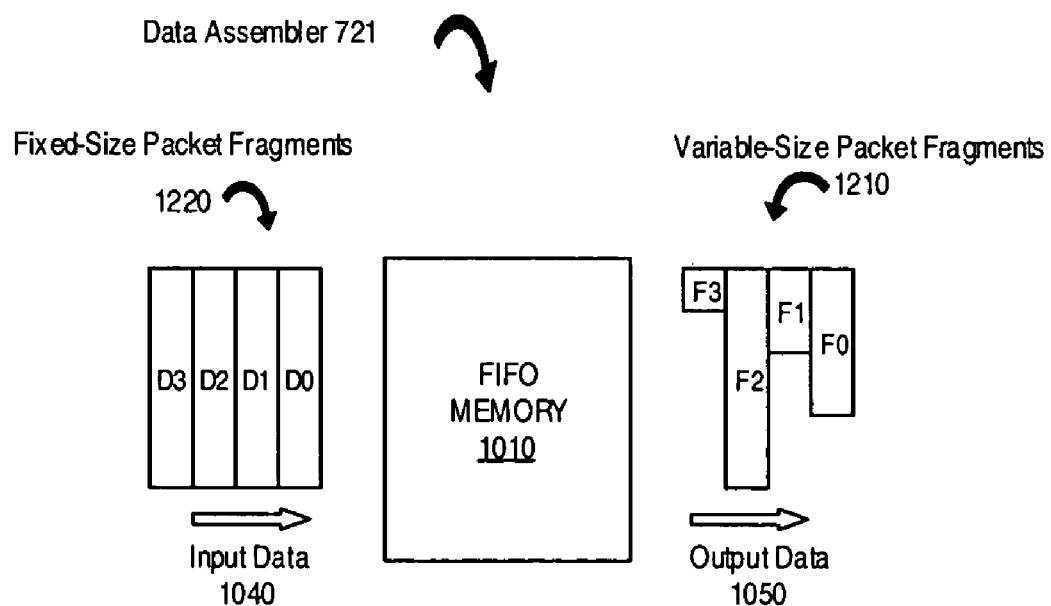
FIG. 12 illustrates the operation of one embodiment of a data assembler including a FIFO memory for buffering packets in a receive path.

FIG. 12 illustrates the operation of one embodiment of a data assembler including a FIFO memory for buffering packets in a receive path. Data assembler 721 includes a FIFO memory 1010. Input data 1040 is written to the FIFO memory 1010. The input data 1040 may include fixed-size packet fragments 1220. Output data 1050 is read from the output FIFO memory 1010. The output data 1040 may include variable-size packet fragments 1210. In this embodiment, the FIFO memory 1010 may be used to buffer fixed-size packet fragments 1220, and output variable-size packet fragments 1210. The variable-size packet fragments 1210 may be smaller than the fixed-size packet fragments 1220. In one embodiment, the fixed-size packet fragments 1220 may have a unit access width W and the variable-size packet fragments 1210 may have a fraction of a unit access width X). In one embodiment, the fraction of the unit access may be equal to the number of bytes of the output data 1050 (e.g. variable-size packet fragments) that is read from the FIFO memory 1010 and the unit access may be equal to the number of bytes of the input data 1040 (e.g., fixed-size packet fragments) that is written to the FIFO memory 910. In one embodiment, the data insertion block 711 may be used to add overhead bytes such as control information including port or channel address, training pattern, and/or parity, as required by the bus protocol (e.g., SPI-5). In another embodiment, other control information may be included as overhead bytes. In one embodiment, the data assembler 721 implements a variable-size transfer on read side, and a fixed-size transfer on the write side. In another embodiment, the data assembler 721 may be used when variable-size data is read from multiple FIFO memories and output through a single bus such as SPI-5. Data assembler 721 may handle data for multiple byte widths, for example, 32 bytes (256 bits). Alternatively in a 10G (10 gigabits per second) system, the byte width may be 16 bytes (128 bits). The output data 1050 may be packet fragments that are less than the data path width W (e.g., variable-size packet fragments 1210) and may be read from the FIFO memory 1010. The input data 1040 may be packet fragments that are equal to the data path width W (e.g., fixed-size packet fragments 1220) and may be written to the FIFO memory 1010.

In one embodiment, as described above, the scheduler 730 may be in the data path that is output from the data assemblers $720_1$-$720_N$ to the output memory 620. In another embodiment, the scheduler 730 may be configured outside the data path and configured to control the data path that is output from the data assemblers $720_1$-$720_N$ to the output memory 620. In one exemplary embodiment, a minimum packet size of 8 bytes and 16 communication channels may be used.

In a conventional interface, the multiple output memories that correspond to each communication channel need to be read through a tri-statable bus and so each memory is 'wired-or'ed at its output. Usually memories have tristated outputs, so if there are multiple memories writing to a bus, the tristate capability can be used to access one of the memories. This tristating is referred as 'wire-or' ing. Alternately, this could be a multiplexer of all outputs of the memory blocks. In one embodiment, link layer interface 541 may not require a tristate bus to access the multiple output memories because link layer interface 541 may have only one write port of output memory 620. The output memory 620 may be divided into memory segments that correspond to communication channels. These memory segments may be apportioned according to bandwidth and use of a particular communication channel, and or may be dynamically changed to accommodate an increased used on a particular communication channel.

In one embodiment, the scheduler 730 determines the order of writes to an output memory 620 of a link layer interface 541 by implementing a scheduling policy. The scheduling policy may have a set of priorities that are used to determine the order of scheduling writes to the write port of output memory 620. An appropriate policy may be used to prevent overrun of the output memory 620. The scheduling policy in one embodiment may include a first and highest priority, a second priority, and a third priority. The first priority, which may be a highest priority, may select all assemblers with a fill level greater than twice the bus width (2W) (for example, twice 32-bytes is 64-bytes, for a 256-bit data path). The first priority may include selecting all data assemblers having an incomplete packet, as this may indicate a likelihood that the communication channel will be written to the output memory 620 in the next cycle. The second priority may select all data assemblers with a fill level greater than the bus width (W) and not covered in previous priority selection. The third priority may select all data assemblers which have an EOP. The third priority may prevent a packet from getting stuck when the required level is not reached. In one embodiment, if multiple data assemblers are selected having a same priority, a data assembler of the multiple data assemblers selected having an earliest received packet fragment is selected. In another embodiment, if multiple data assemblers are selected having a same priority, the scheduler 730 assigns a weight to each of multiple data assemblers selected with a same priority and selects a data assembler having a highest weight from among the assigned weights through a weighted round-robin process, and after selecting the data assembler having the highest weight, the scheduler 730 assigns a least weight to the data assembler previously selected having the highest weight.

In another embodiment, the scheduling policy may include a first priority, second priority, third priority, and fourth priority. The first priority, which may be a highest priority, may select all assemblers with a fill level greater than twice the bus width (2W) and have no end-of-packet (EOP) or start-of-packet (SOP). First priority may indicate a likelihood that the data assembler selected will be written to the output memory 620 in the next cycle. In another embodiment, the first priority may select all assembler with a fill level greater than twice the bus width (2W) and have no EOP or SOP and have an incomplete packet. The second priority may select all data assemblers with a fill level greater than twice the bus width (2W) and not covered in previous priority selection. The third priority may select all data assemblers with a fill level greater than the bus width (W) and not covered in previous priority selection. The fourth priority may select all data assemblers which have an EOP. The fourth priority may prevent a packet from getting stuck when the required level is not reached. In alternative embodiments, less or more priorities than 3 or 4 may be used and other prioritizing classifiers may be used to determine the order of write priority to the output memory 620.

In one exemplary embodiment, the link layer interface 541 including the scheduler 730 may receive data from a SPI, such as SPI-5. In another embodiment, the link layer interface 541 including scheduler 730 may receive data from other interfaces known in the art. In another embodiment, the scheduler 730 may implement a scheduling policy with scheduling priorities known in the art with no data loss due to the scheduling policy. In another embodiment, the data assemblers $720_1$-$720_N$ may have different fill levels as described above and the priorities may vary according to the different fill levels of the data assemblers $720_1$-$720_N$.

In another embodiment, the data assemblers may have a higher depth than 3W when there is a higher number of communication channels used. In one exemplary embodiment of the data assemblers $720_1$-$720_N$ having a depth that is more than 3W, the scheduling policies implemented by method need to be expanded such that data assemblers with the highest fill level are handled first. For example, if the depth of the data assemblers $720_1$-$720_N$ is 4W, then all assemblers with a fill level greater than 3W should be checked first, followed by the data assemblers with fill level greater than 2W, followed by the data assemblers with a fill level greater than W, followed by the data assemblers with an EOP.

In one exemplary embodiment, the data assembler size could be 768 bits with the data path width of 256 bits, behaving as a FIFO memory 910 with a max depth of 3W, three times the input data path of the data extraction block 710. Depending on the fill level in each data assembler, and the current status of each output FIFO of output memory 620, one communication channel per cycle is scheduled for writing to the output memory 620.

Figure 13:
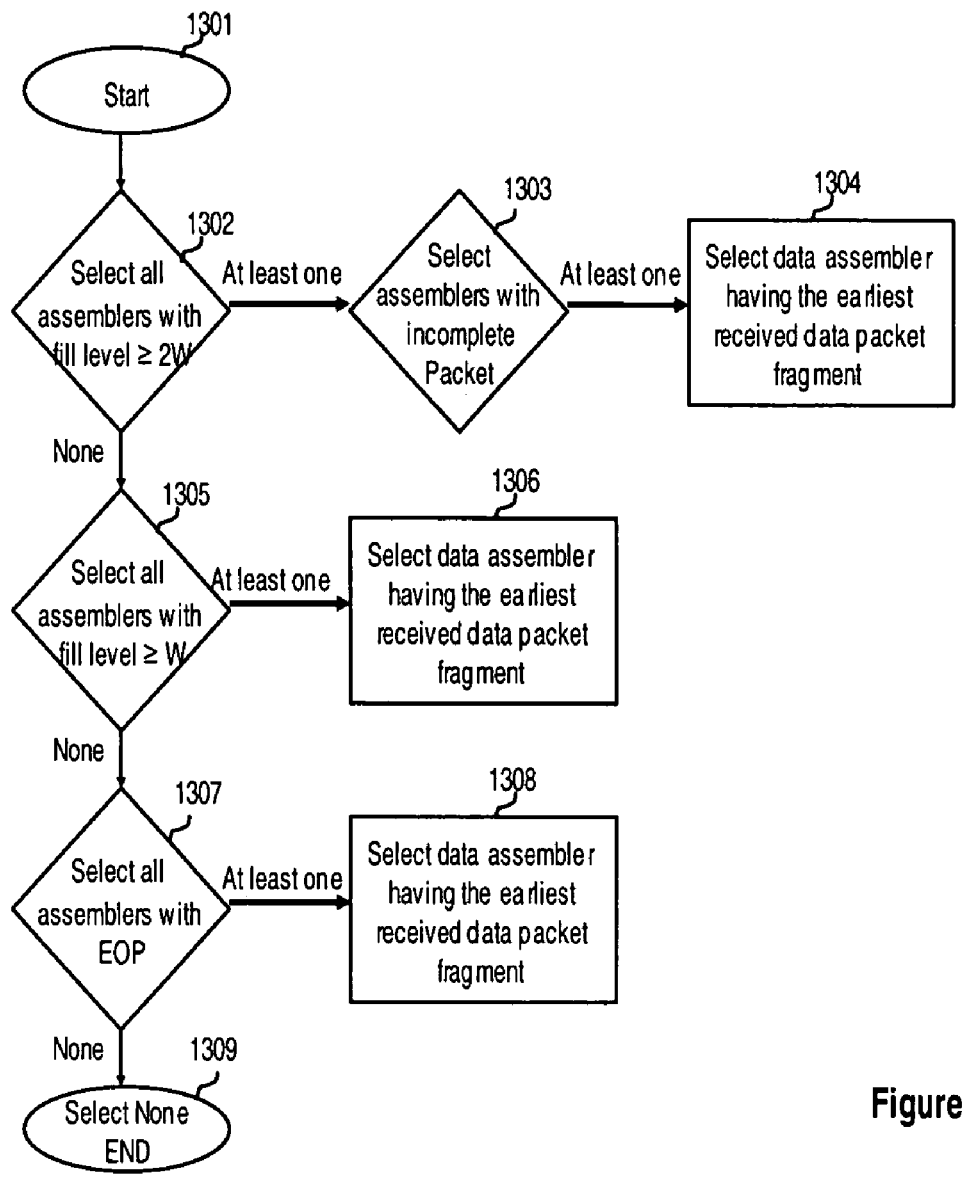
FIG. 13 illustrates a flowchart of a static scheduling method.

FIG. 13 illustrates a flowchart of a static scheduling method. In one embodiment, a scheduling policy as described above may be implemented in scheduler 730 to determine the order of writes to a write port of output memory 620. In one embodiment, the method is started, step 1301, and all data assemblers of the plurality of data assemblers $720_1$-$720_N$ having a fill level at least equal to and greater than 2W, two times the data path width of the input data bus of data extraction block 710, are selected, step 1302. All data assemblers with incomplete packets are selected, step 1303. If multiple data assemblers are selected having a same priority in steps 1302 or 1303, a data assembler of the multiple data assemblers selected having an earliest received packet fragment is selected to have a highest priority for writing to the output memory 620, step 1304. As long as there is at least one data assembler selected in step 1302, the following steps 1303-1304 are repeated. As long as there is at least one data assembler selected in step 1303, the following step 1304 is repeated.

If there are no more data assemblers selected in step 1302 and/or 1303, all data assemblers of the plurality of data assemblers $720_1$-$720_N$ having a fill level at least equal to and greater than W, the data path width of the input data bus of data extraction block 710, are selected, step 1305. If multiple data assemblers are selected having a same priority in step 1305, a data assembler of the multiple data assemblers selected having an earliest received packet fragment is selected to have a highest priority to be written to the output memory 620, step 1306. As long as there is at least one data assembler selected in step 1305, step 1306 is repeated.

If there are no more data assemblers selected in step 1302 and/or 1303, and/or 1305, all data assemblers of the plurality of data assemblers $720_1$-$720_N$ having a an EOP, are selected, step 1307. If multiple data assemblers are selected having a same priority in step 1307, a data assembler of the multiple data assemblers selected having an earliest received packet fragment is selected to have a highest priority to be written to the output memory 620, step 1308. As long as there is at least one data assembler selected in step 1307, step 1308 is repeated. If there are no more data assemblers selected in step 1302 and/or 1303, and/or 1305, and/or 1307, no data assemblers of the plurality of data assemblers $720_1$-$720_N$ are selected and the process ends, step 1309.

In one embodiment of the link layer interface 541 including a scheduler 730, the priorities may be changed dynamically. In one embodiment, for example, a communication channel that may become more frequently used may be assigned a higher priority.

In another embodiment for dynamic scheduling, the "W" or "2W" levels may act as threshold levels, where W may be an almost empty threshold, and 2W as almost full threshold. The highest priority may be given to those data assemblers which are almost full. The next priority may be given to those data assemblers which are not almost full, and/or not almost empty. Within each priority, the data assembler of a communication channel with highest weight may be selected through a weighted round-robin process, where the weight is made the least after the data assembler of the communication channel is selected.

In another embodiment, the output memory 620 may be dynamically allocated and implemented with link lists where each communication channel builds its own link list and each behaves as a FIFO within the output memory 620. One advantage of using a link lists may be that the space per channel may be allocated on a requirement basis and so a higher bandwidth channel may easily get a higher number of buffers than a lower bandwidth channel. Link lists are known in the art and a detailed description has not been included as to not obscure the present invention.

Figure 14:
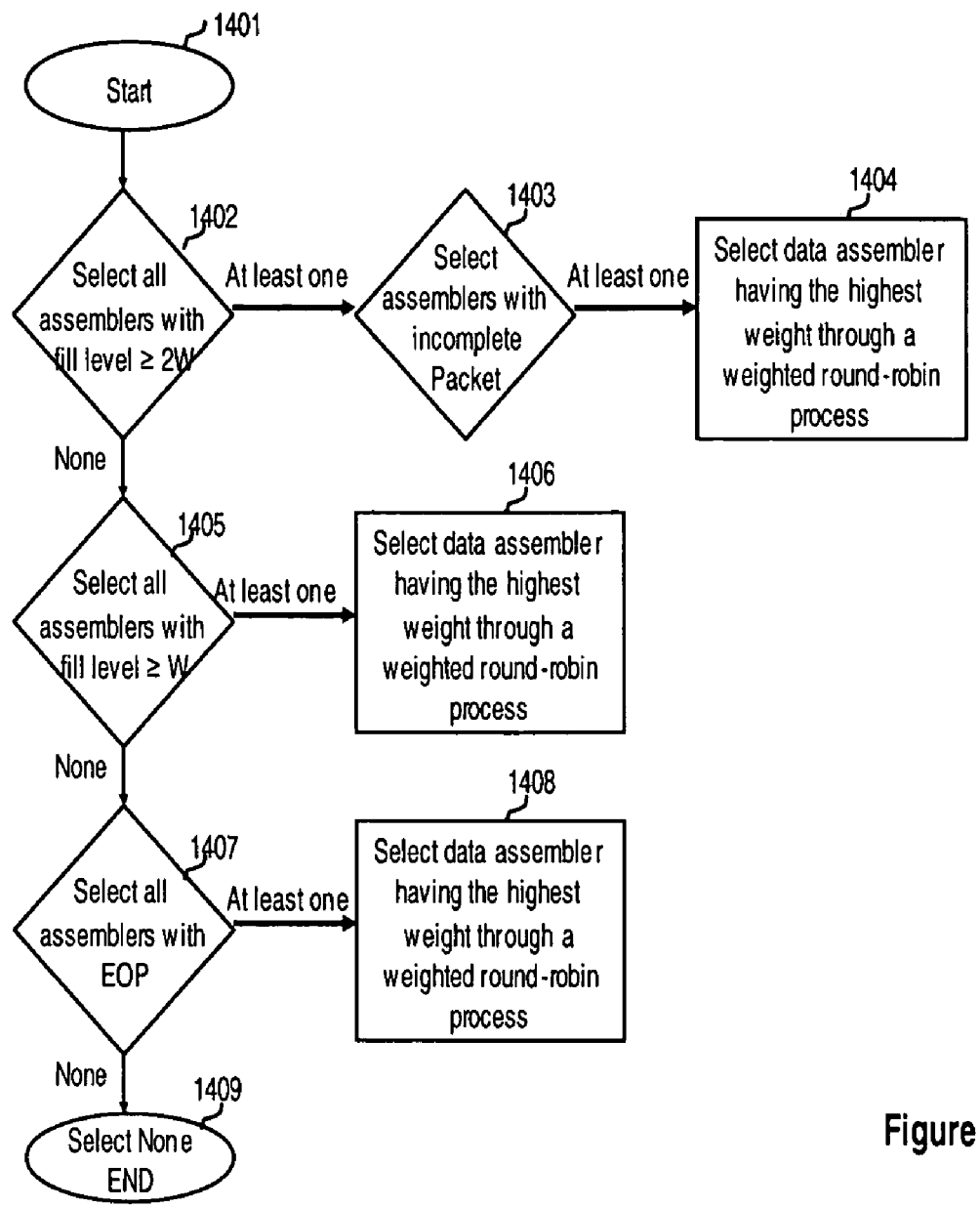
FIG. 14 illustrates a flowchart of a dynamic scheduling method.

FIG. 14 illustrates a flowchart of a dynamic scheduling method. In one embodiment, a scheduling policy as described above may be implemented in scheduler 730 to determine the order of writes to a write port of output memory 620. In one embodiment, the method is started, step 1401, and all data assemblers of the plurality of data assemblers $720_1$-$720_N$ having a fill level at least equal to and greater than 2W, two times the data path width of the input data bus of data extraction block 710, are selected, step 1402. All data assemblers with incomplete packets are selected, step 1403. If multiple data assemblers are selected having a same priority in step 1402 or 1403, the scheduler 730 assigns a weight to each of multiple data assemblers selected with the same priority and selects a data assembler having a highest weight from among the assigned weights through a weighted round-robin process, and after selecting the data assembler having the highest weight, the scheduler 730 assigns a least weight to the data assembler previously selected having the highest weight, step 1404. As long as there is at least one data assembler selected in step 1402, the following steps 1403-1404 are repeated. As long as there is at least one data assembler selected in step 1403, the following step 1404 is repeated.

If there are no more data assemblers selected in step 1402 and/or 1403, all data assemblers of the plurality of data assemblers $720_1$-$720_N$ having a fill level at least equal to and greater than W, the data path width of the input data bus of data extraction block 710, are selected, step 1405. If multiple data assemblers are selected having a same priority in step 1405, the scheduler 730 assigns a weight to each of multiple data assemblers selected with the same priority and selects a data assembler having a highest weight from among the assigned weights through a weighted round-robin process, and after selecting the data assembler having the highest weight, the scheduler 730 assigns a least weight to the data assembler previously selected having the highest weight, step 1406. As long as there is at least one data assembler selected in step 1405, step 1406 is repeated.

If there are no more data assemblers selected in step 1402 and/or 1403, and/or 1407, all data assemblers of the plurality of data assemblers $720_1$-$720_N$ having a an EOP, are selected, step 1405. If multiple data assemblers are selected having a same priority in step 1407, the scheduler 730 assigns a weight to each of multiple data assemblers selected with the same priority and selects a data assembler having a highest weight from among the assigned weights through a weighted round-robin process, and after selecting the data assembler having the highest weight, the scheduler 730 assigns a least weight to the data assembler previously selected having the highest weight, step 1408. As long as there is at least one data assembler selected in step 1407, step 1408 is repeated. If there are no more data assemblers selected in step 1402 and/or 1403, and/or 1405, and/or 1407, no data assemblers of the plurality of data assemblers $720_1$-$720_N$ are selected and the process ends, step 1409.

In one embodiment, SystemC code may be implemented to execute a scheduling policy on a scheduler. Appendix A is a SystemC main executable program code listing that includes an exemplary embodiment of a program file that implements a scheduling policy in scheduler 730 of link layer interface 541. Appendix B is a SystemC header code listing, "sch.cpp," that includes an exemplary embodiment of a structure file that implements the scheduling policy in scheduler 730 of link layer interface 541. Appendix C is a SystemC structure code listing, "sch.h," that includes an exemplary embodiment of a header file that implements the scheduling policy in scheduler 730 of link layer interface 541. In another embodiment, other languages may be used, for example, C, C++, Java, Perl, Visual Basic, and other languages known in the art.

Although the methods and apparatus of the invention have been described at times in relation to hardware components, the methods and apparatus may also be implemented by software or a combination of hardware and software. Portions of the present invention may be provided as in the form of a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may includes, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. An apparatus, comprising:
    a data extraction block;
    a plurality of data assemblers coupled to the data extraction block; and
    a scheduler coupled to the plurality of data assemblers, wherein the scheduler is configured to operate with a scheduling policy comprising a set of priorities to determine an order of data writes to an output memory coupled to the scheduler from the plurality of data assemblers, including
        selecting one or more of the plurality of data assemblers having a fill level greater than twice an input data path width of an input data bus and having no end-of-packet (EOP) or start-of-packet (SOP) as a first priority,
        selecting one or more of the plurality of data assemblers having a fill level greater than twice the input data path width of the input data bus and not covered in the first priority selection as a second priority,
        selecting one or more of the plurality of data assemblers having a fill level greater than the input data path width of the input data bus and not covered in the first and second priority selections as a third priority, and selecting one or more of the plurality of data assemblers having an end-of-packet (EOP) as a fourth priority.

2. The apparatus of claim 1, wherein the plurality of data assemblers corresponds to a plurality of communication channels.

3. The apparatus of claim 1, wherein a data path width of a first data assembler, of the plurality of data assemblers, is greater than the data path width of the input data bus of the data extraction block.

4. The apparatus of claim 3, wherein the data path width of the first data assembler is approximately three times the data path width of the input data bus of the data extraction block.

5. The apparatus of claim 1, further comprising a protocol parser coupled to the data extraction block.

6. The apparatus of claim 5, wherein the protocol parser, the data extraction block, the plurality of data assemblers, the scheduler, and the output memory reside in a framer.

7. The apparatus of claim 6, further comprising:
a link layer device coupled to the protocol parser of the framer;
a first physical interface device coupled to the link layer device; and
a second physical interface device coupled to the framer.

8. The apparatus of claim 7, wherein the second physical interface device is an Ethernet device and the first physical interface device is a synchronous optical network (SONET) device.

9. The apparatus of claim 7, wherein the first physical interface device, the second physical interface device, the link layer device, and the framer reside in a line card.

10. The apparatus of claim 9, wherein the line card is coupled to a wide area network (WAN).

11. The apparatus of claim 1, wherein a first data assembler, of the plurality of data assemblers, comprises:
a first-in-first out (FIFO) memory;
a read pointer of the FIFO memory, the read pointer to increment by a unit access per read; and
a write pointer of the FIFO memory, the write pointer to increment by a unit access per write.

12. The apparatus of claim 1, wherein a first data assembler, of the plurality of data assemblers, comprises:
a first-in-first out (FIFO) memory;
a read pointer of the FIFO memory, the read pointer to increment by a unit access per read; and
a write pointer of the FIFO memory, the write pointer to increment by a fraction of a unit access per write.

13. A method, comprising:
receiving input data on an input data bus;
extracting packet fragments for a plurality of communication channels from the input data;
assembling the packet fragments in a plurality of data assemblers corresponding to the plurality of communication channels; and
scheduling data writes from the plurality of data assemblers to an output memory, wherein the data writes are scheduled according to a scheduling policy including
selecting one or more of the plurality of data assemblers having a fill level greater than twice an input data path width of the input data bus and having no end-of-packet (EOP) or start-of-packet (SOP) as a first priority,
selecting one or more of the plurality of data assemblers having a fill level greater than twice the input data path width of the input data bus and not covered in the first priority selection as a second priority,
selecting one or more of the plurality of data assemblers having a fill level greater than the input data path width of the input data bus and not covered in the first and second priority selections as a third priority,
selecting one or more of the plurality of data assemblers having an end-of-packet (EOP) as a fourth priority.

14. The method of claim 13, wherein if multiple data assemblers are selected with a same priority, a data assembler of the multiple data assemblers having an earliest received packet fragments is selected.

15. The method of claim 13, further comprising:
assigning a weight to each of two or more of the plurality of data assemblers selected with a same priority;
selecting a data assembler having a highest weight from among the assigned weights through a weighted round-robin process; and
assigning a least weight to the data assembler previously selected having the highest weight.

16. An apparatus, comprising:
a data extraction block;
plurality of data assemblers coupled to the data extraction block, wherein the plurality of data assemblers corresponds to a plurality of communication channels;
an output memory; and
means for scheduling data writes to the output memory from the plurality of data assemblers of each communication channel including
selecting one or more of the plurality of data assemblers having a fill level greater than twice an input data path width of an input data bus and having no end-of-packet (EOP) or start-of-packet (SOP) as a first priority,
selecting one or more of the plurality of data assemblers having a fill level greater than twice the input data path width of the input data bus and not covered in the first priority selection as a second priority,
selecting one or more of the plurality of data assemblers having a fill level greater than the input data path width of the input data bus and not covered in the first and second priority selections as a third priority, and
selecting one or more of the plurality of data assemblers having an end-of-packet (EOP) as a fourth priority.

17. The apparatus of claim 16, further comprising means for reducing memory overhead.

18. The apparatus of claim 17, further comprising means for reducing memory die area.

19. A machine-readable medium having stored thereon instructions which, when executed by a processor, cause the processor to perform the following comprising:
selecting one or more of a plurality of data assemblers having a fill level greater than twice an input data path width of an input data bus and having no end-of-packet (EOP) or start-of-packet (SOP) as a first priority;
selecting one or more of the plurality of data assemblers having a fill level greater than twice the input data path width of the input data bus and not covered in the first priority selection as a second priority;
selecting one or more of the plurality of data assemblers having a fill level greater than the input data path width of the input data bus and not covered in the first and second priority selections as a third priority; and
selecting one or more of the plurality of data assemblers having an end-of-packet (EOP) as a fourth priority.

20. The machine-readable medium of claim 19, wherein if multiple data assemblers are selected with a same priority, a data assembler of the multiple data assemblers having an earliest received data packet fragments is selected.

21. The machine-readable medium of claim 19, wherein the processor further performs the following comprising:

assigning a weight to each of two or more of the plurality of data assemblers selected with a same priority;

selecting a data assembler having a highest weight from among the assigned weights through a weighted round-robin process; and assigning a least weight to the data assembler previously selected having the highest weight.

* * * * *